Figure 1:
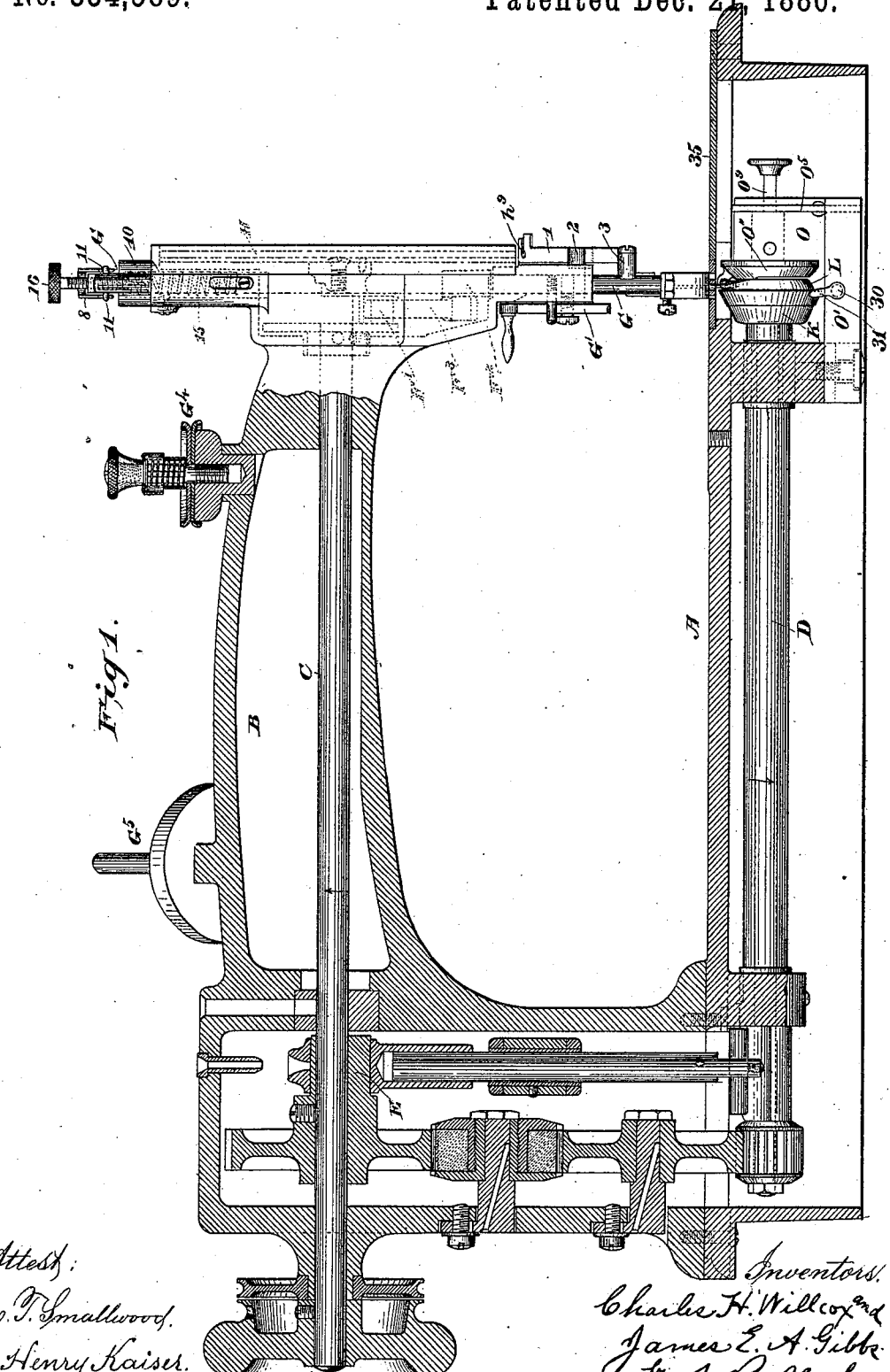

(No Model.) 9 Sheets—Sheet 1.

C. H. WILLCOX & J. E. A. GIBBS.
SEWING MACHINE.

No. 354,589. Patented Dec. 21, 1886.

Attest:
Geo. T. Smallwood.
J. Henry Kaiser.

Inventors:
Charles H. Willcox and
James E. A. Gibbs
by A. Pollok
their attorney

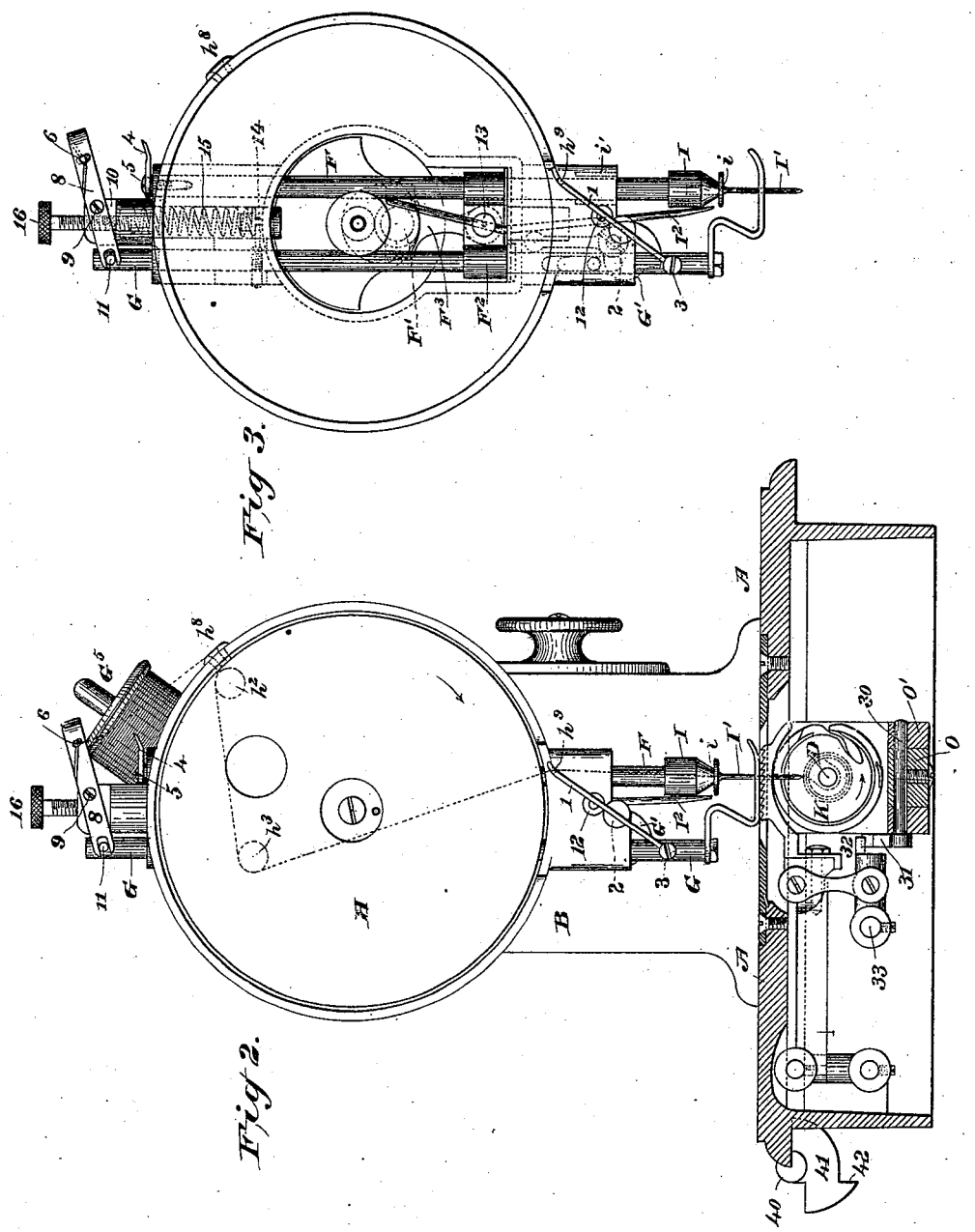

(No Model.) 9 Sheets—Sheet 3.
C. H. WILLCOX & J. E. A. GIBBS.
SEWING MACHINE.
No. 354,589. Patented Dec. 21, 1886.
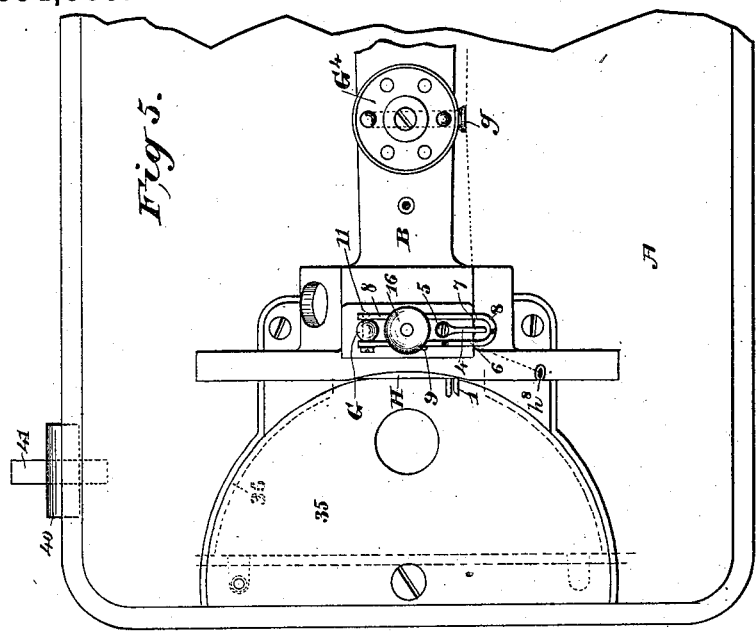
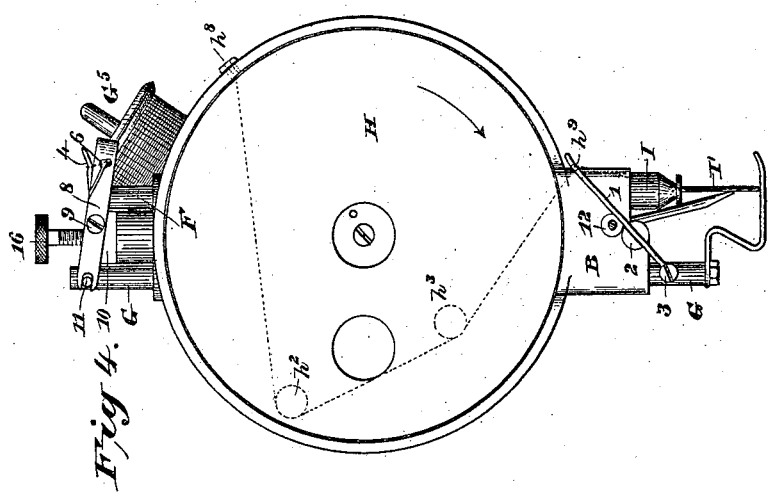

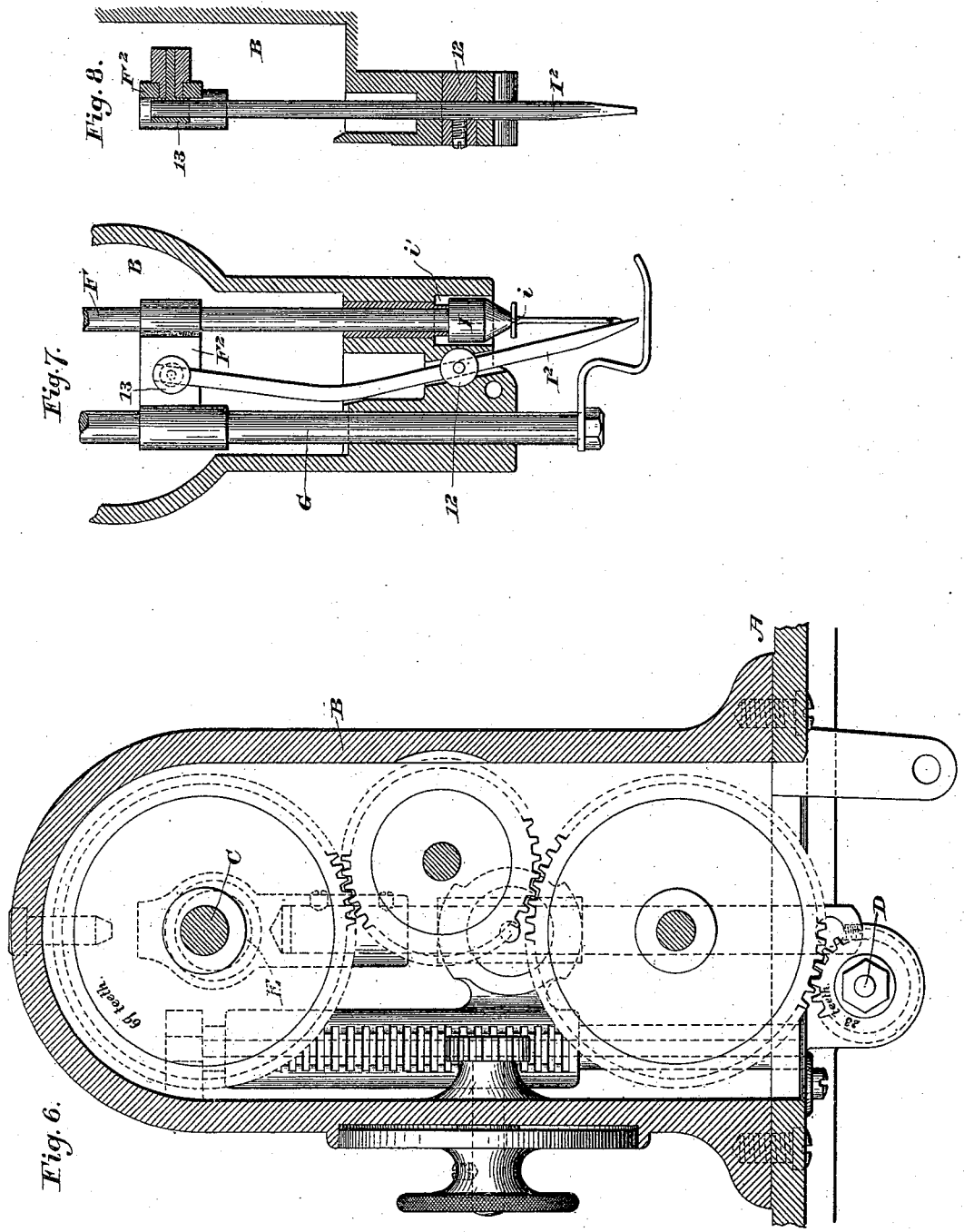

(No Model.) 9 Sheets—Sheet 5.
C. H. WILLCOX & J. E. A. GIBBS.
SEWING MACHINE.
No. 354,589. Patented Dec. 21, 1886.
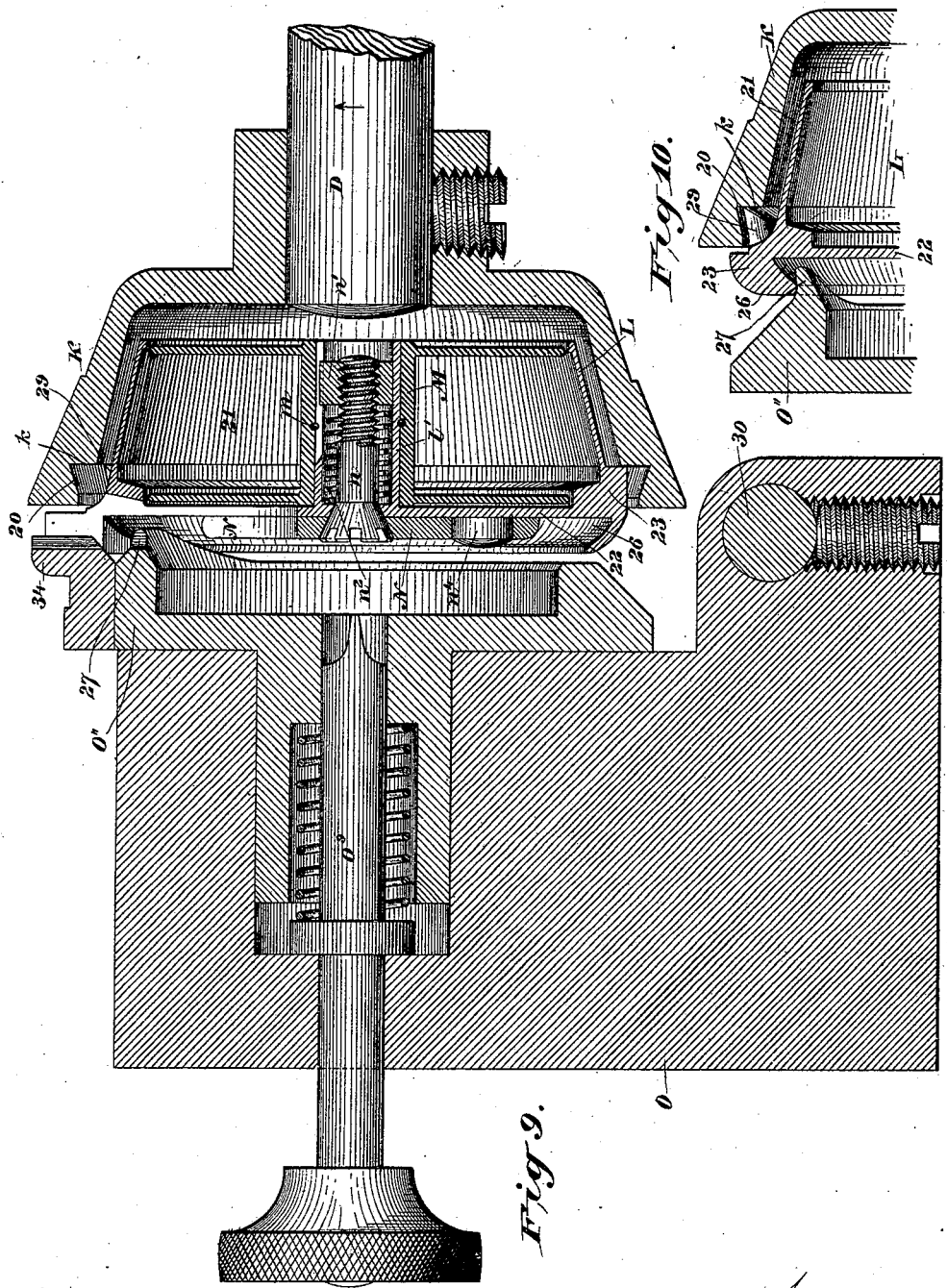

(No Model.) 9 Sheets—Sheet 6.

C. H. WILLCOX & J. E. A. GIBBS.
SEWING MACHINE.

No. 354,589. Patented Dec. 21, 1886.

Attest:
Geo. T. Smallwood.
J. Henry Kaiser.

Inventors
Charles H. Willcox
James E. A. Gibbs
by A. Pollok
their attorney (No Model.) 9 Sheets—Sheet 7.
C. H. WILLCOX & J. E. A. GIBBS.
SEWING MACHINE.
No. 354,589. Patented Dec. 21, 1886.
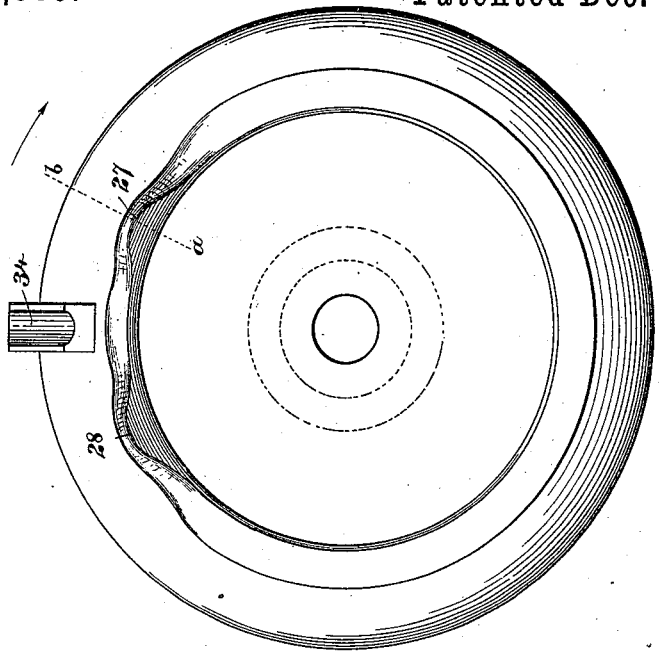
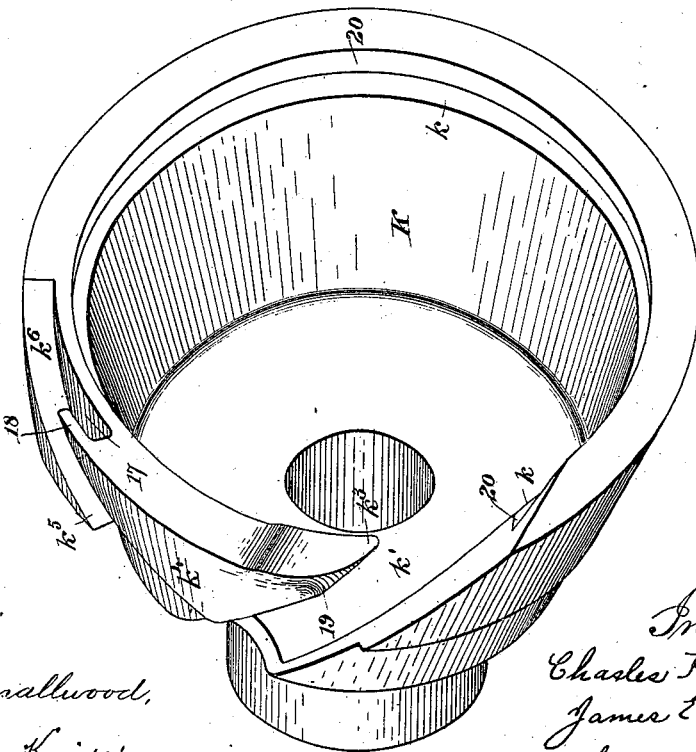

(No Model.) 9 Sheets—Sheet 8.

C. H. WILLCOX & J. E. A. GIBBS.
SEWING MACHINE.

No. 354,589. Patented Dec. 21, 1886.

Attest:
Geo. T. Smallwood,
J. Henry Kaiser.

Inventors:
Charles H. Willcox and
James E. A. Gibbs
by A. Pollok,
their attorney (No Model.) 9 Sheets—Sheet 9.
C. H. WILLCOX & J. E. A. GIBBS.
SEWING MACHINE.
No. 354,589. Patented Dec. 21, 1886.
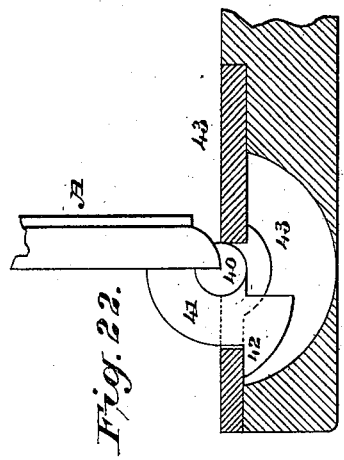
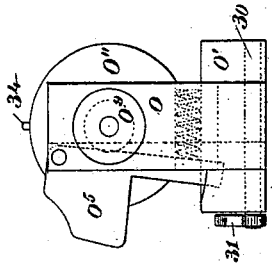
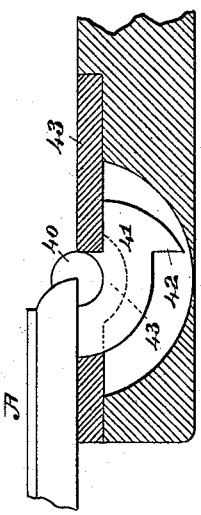
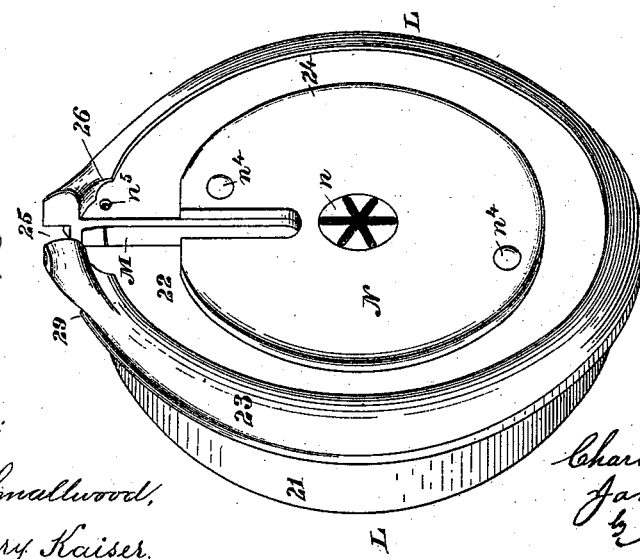
Attest:
Geo. T. Smallwood,
J. Henry Kaiser.
Inventors,
Charles H. Willcox and
James E. A. Gibbs
by A. Pollok
their attorney

UNITED STATES PATENT OFFICE.

CHARLES H. WILLCOX, OF NEW YORK, N. Y., AND JAMES E. A. GIBBS, OF RAPHINE, VIRGINIA, ASSIGNORS TO THE WILLCOX & GIBBS SEWING MACHINE COMPANY, OF NEW YORK.

SEWING-MACHINE.

SPECIFICATION forming part of Letters Patent No. 354,589, dated December 21, 1886.

Application filed July 31, 1883. Serial No. 102,437. (No model.)

*To all whom it may concern:*

Be it known that we, CHARLES HENRY WILLCOX, of New York city, in the county and State of New York, and JAMES EDWARD ALLEN GIBBS, of Raphine, in the county of Rockbridge and State of Virginia, have invented a new and useful Improvement in Sewing-Machines, which improvement is fully set forth in the following specification.

This invention, although in part applicable to other machines, relates more particularly to double-thread sewing-machines making a lock-stitch by means of a continuously-revolving hook or looper, operating in conjunction with the eye-pointed needle and other common parts of sewing-machines.

It has for its object to increase the range of work, the lightness in running, and generally to perfect the machine. It is designed as an improvement on the machine described in Letters Patent No. 239,998, granted to us and dated April 12, 1881, but may be embodied in machines differing more or less in construction therefrom.

The invention consists, first, in means for adjusting, regulating, or varying at will the length of thread drawn in and given down by the take-up, in order to supply at each stitch the proper length of thread, whether the work under the presser-foot be thick and heavy or thin and light fabric. The take-up in tightening a stitch should ordinarily draw the loop of the upper thread which has been passed around the body of the under thread up into the fabric until the lock is in the center of the work. The slack to be drawn up is therefore greater as the work is thicker, since, in addition to the loop from the surface of the work-plate around the body of the under thread and the point of the hook, (or the shuttle in shuttle machines,) which loop is uniform in all kinds of sewing, the thread between the center of the work and the top of the work-plate must also be drawn up, and this additional thread is greater as the work is thicker, being equal in amount to such thickness. Moreover, since the thread in each completed stitch must extend from the center of the work or fabric at one needle-puncture to the center of the work at the next, more thread is used up in each stitch in sewing thick than in sewing thin work. If the lock be not drawn to the center of the work, but to a point above or below the same, the amount of slack to be taken up will be increased or diminished, while the amount to be drawn from the spool will be to the same extent diminished or increased, so that the same variation in the action of the take-up is desirable. The thicker the work, therefore, in any case the more thread is the take-up required to draw in and give down.

In the patented machine above referred to the take-up is uniform in its action, and draws in and gives down the length of thread required for ordinary work, the additional thread for thicker work being drawn down by the hook as it passes under the bobbin and bobbin-case. This plan is not, however, desirable under all circumstances, since the hook has to perform more than its proper function of carrying the loop around the body of the under thread, and is subjected to a strain, which increases with the thickness of the fabric, and since the thread also is subjected to greater strain than would otherwise be the case it is therefore more liable to break. The ordinary plan, where attempt is made to supply more or less thread as the work is thicker or thinner, is to so adjust the take-up that it will draw in and give down thread enough for the thickest work, and to place a light spring at a suitable point for controlling the extra thread by keeping it always taut. This plan is objectionable, because the spring maintains always a pull on the thread and does not allow it to be perfectly free, (such freedom being desirable,) and because at a very high rate of speed the elasticity of the spring is insufficient to keep the thread taut, unless a spring so strong as to interfere with the proper operation of the hook or shuttle be employed.

By the present invention the difficulties of both the foregoing plans are avoided, the length of thread drawn in and given down by the take-up being adjustable, so that the proper quantity without excess is supplied to the interlocking device—*i. e.*, the hook or shuttle in lock-stitch machines.

It may be observed that if the take-up be constructed and arranged to draw up and give down the length of thread required in sewing thick work the stitches would be tightened and the amount of thread consumed at each stitch be drawn from the spool; but the excess would interfere with the interlocking of the threads, and the difficulty would be much greater in rotary-hook machines than in shuttle machines. In rotary-hook machines, also, the difficulty would be greater in machines wherein the hook has more than one revolution to each reciprocation of the needle, as in one patented machine referred to, and in that to be hereinafter described, than in those employing a single revolution, the greater speed increasing the liability of the thread to become caught and tangled.

This first part of the invention, although applicable generally to sewing-machines, as well to those using a shuttle as to those using a rotary hook, is particularly useful in connection with a rotary hook, and specially with a rotary hook making more than one revolution to each reciprocation of the needle.

The best means for varying or regulating the length of thread drawn in and given out by the take-up consists of one or more shifting thread-guides adapted to be set or adjusted in different positions relative to the pin-eye, or other device which acts upon the thread, so that the effective action of said device is increased or decreased in a positive manner, although its actual motion may remain unchanged.

In order to effect the desired regulation or variation with the least difficulty, and at the same time in the most perfect manner, it is made automatic by connecting the adjustable part—such as the shifting thread guide or guides just mentioned—with the presser-foot or presser-bar, so that the insertion of the work under the presser-foot adjusts the said part to the proper extent, and so that when crossing seams or otherwise passing from thin to thick work, and vice versa, the adjustment is changed without care on the part of the operator. This automatic regulation of the amount of thread drawn in and given down by the take-up constitutes the second part of the invention.

The invention, thirdly, consists in means for varying or regulating the time at which the take-up, having completed the drawing in, slackens and gives down the thread. The object of this improvement, as of the preceding, is to adapt the machine to operate equally well upon a wide range of work. After the completion of a stitch it is desirable, first, to maintain the thread taut until the needle is about to penetrate the work, since if slackened before it is liable to catch around or be impaled by the point; second, to slacken the thread before the needle enters the work, since if kept taut the thread is liable to spring the needle more or less to one side, so that it may not throw the loop properly for the point of the interlocking device (hook or shuttle) to enter it, or, if the deflection be considerable, so that it may strike the work-plate or some part beneath it and be bent or broken or cause injury to other parts; and, third, to deliver or give down the thread with sufficient rapidity to supply loose thread to the needle after the eye enters the work, since if the needle has to draw thread through the tension there is great liability of its breaking or of drawing the needle aside. These being the desirable conditions, to secure them the thread must be slackened and given down sooner in sewing thick than in sewing thin work, since the needle penetrates the former earlier in its descent than it does the latter. By means of the adjustment the thread is or may be slackened and given down sooner or later, according to the thickness of the work under the presser-foot.

The invention, fourthly, consists in setting or adjusting the means for varying or regulating the time at which the thread is slackened or given down automatically by a connection with the presser-foot.

The foregoing improvements are not limited to any particular style or type of take-up, the principle of operation indicated being, so far as we are aware, entirely new, and a take-up of any ordinary or suitable construction could be employed.

The fifth part of the invention, however, has reference solely to rotary take-ups which have one or more continuously-revolving pins or other devices to act upon and draw in the thread; and it consists in the combination, with a rotary take-up, of an auxiliary take-up or thread-controller for delivering or giving down the thread at the proper time more rapidly than would be done by the rotary device alone. Of rotary take-ups, some contain means for casting off the loop when tightened; but it has been found (in our experience) impossible to secure sufficient exactness in the casting off, it being sometimes too soon, and again not soon enough. Others (and the take-up described in our patent above referred to is of this sort) release or deliver down the thread by the mere recession of the device or devices acting upon it, and while these are entirely positive and uniform in their action, they act very slowly in passing the dead-points, or in completing a stitch and commencing to release or give down the thread for the succeeding one, so that either the parts must be so constructed and arranged that the rotary take-up shall have turned through a considerable angle by the time the needle reaches the upper surface of even the thickest work, or in sewing thick work the needle must draw down the thread as it passes into it. If the former plan be adopted, the needle must be given a longer stroke, or other means must be adopted to delay its entering the work, and if the latter, the difficulty before pointed out of having a strain upon the needle as it enters or passes through the work will be encountered. The use of the rapid-action auxiliary take-up or thread-controller obviates both difficulties.

It is obvious that the auxiliary apparatus may have a fixed adjustment—as, for example, in a machine for sewing work uniform or but slightly varying in thickness. The said apparatus is, however, mainly designed to adapt the machine to sew with equal perfection light or heavy fabrics, the auxiliary apparatus being adjustable to regulate or vary the time at which the thread is slackened and the rapidity with which it is given down, according to the thickness of the fabric or work. Preferably the adjustment is made automatic by a connection with the presser-foot. These dispositions constitute the sixth and seventh parts of the invention.

The eighth part of the invention consists in the combination, with a take-up, of one or more adjustable thread-guides for varying or regulating the length of thread drawn in and given down for varying or regulating the point at which the stitch is completed, or for effecting both adjustments.

The ninth part of the invention has reference to rotary-hook machines, and consists in a construction and combination of parts whereby the hook or looper is given three revolutions to each reciprocation of the needle-bar. The object of this is to carry the loop more quickly around the body of the under thread than is the case with a hook having two revolutions, or a single revolution with an accelerated motion at the beginning. The advantage of this result is in the ability to complete the stitch sooner without increasing the rapidity of action of the take-up, and by reason of the earlier completion of the stitch to shorten the stroke of the needle, or to allow a longer time for the action of the take-up, or to produce both effects, each in a less degree.

In using a hook which makes three revolutions to a stitch, it is not or may not be convenient, owing to the high speed of the hook, to take up the loop in advance of its point, and under such circumstances it is found that the hook in its second revolution is liable to catch in the loop which has just been discharged. To overcome this difficulty a retaining device or loop-detainer is placed on the hook behind the point to hold back the loop until the point has passed so far beyond the needle-hole as to be in no danger of catching the loop. Heretofore a retaining device has been used in the rotary hook or looper of chain-stitch machines to hold back the loop and prevent its fouling with the point; also in rotary-hook lock-stitch machines wherein the hook in drawing down one loop takes up the preceding one; also in rotary-hook lock-stitch machines wherein the hook makes two revolutions at each stitch. This (tenth) part of the invention therefore consists in the application and adaptation of the retaining device and its use in the rotary hook of the lock-stitch machine embodying the former improvement of having the hook make three revolutions at each stitch, or, in other words, the combination, with the other elements of such a machine, of the rotary hook provided with a retaining device or loop-detainer.

The invention, eleventhly, consists in a rotary hook provided with a retaining device or loop-detainer behind the point, and a loop-shedder or device for laying the outside strand of the loop of upper thread across the point of the hook and retaining it thereon.

The invention, twelfthly, consists in the combination, with a cylindrical bobbin and its case, of a cup-shaped rotary hook having the internal surface of the periphery of a frusto-conical form, the point extending the whole width of the periphery, or at least to a point beyond the bobbin-case. In this form of hook the inner surface of the point approaches the center toward the back of the hook. It therefore not only carries the inner strand of the loop of upper thread across the case containing the cylindrical bobbin, but down behind it. This part of the invention also consists in a bobbin-case for containing a cylindrical bobbin provided with a barrel of frusto-conical form, the same being best adapted for use with the cup-shaped hook having a frusto-conical interior. This form of barrel is preferably used in a bobbin-case provided with a rim or exterior shoulder extending around it, and also with a tension for the under thread, as in the bobbin-case of our patent above referred to, and this special bobbin-case also forms part of the invention.

The invention, thirteenthly, consists in providing the bobbin-case (which is held from turning) with an overhanging projection on the outside thereof, adjacent to the needle-hole, for catching the inner strand of the upper-thread loop as it is carried along by the hook. Heretofore (see the patented machine) the bobbin-case has been provided with a projection on the outside; but this, being straight on the front edge, is not sufficiently certain in its action. To remedy the defect the front edge, or edge adjacent to the needle-hole, is undercut or made overhanging. This overhanging projection may properly be called a "hook," as may also the loop-detainer on the point of the rotary hook; but to avoid confusion between them and the latter the other terms are herein employed. This part of the invention also consists in turning a groove under the point of the hook, or in the inner periphery of the cup-shaped hook, the bottom of said groove being farther from the axis of the hook than the edges, and in shaping the projection on the bobbin-case or the upper portion of the rim, which, being notched, forms on one side the projection referred to, so that when lifted it may enter the groove. The object is the same as before—that is, the more certainly to catch and retain the inner strand of the loop. The advantage in retaining this inner strand of the loop is, that it cannot slip to the front of the bobbin-case, and is therefore less likely to become wrapped about said case.

The invention, fourteenthly, consists in providing the bobbin-case with an open notch on the face thereof at the top for the reception of the needle, and in combining with the notched bobbin-case a stationary projection which extends into said notch and prevents the bobbin-case from turning or revolving. Heretofore the bobbin-case has been provided with a projection to extend into a recess in a stationary holder. The advantage in the alteration is, that the loop may be drawn through the same space which receives the needle, and can be drawn directly up through the needle-hole in the cloth-plate, instead of having to be drawn around and over a projection before coming into the path of the needle, as heretofore. The stop or stationary projection also incidentally serves the purpose of assisting in throwing a loop for the hook by preventing the thread from bulging out on the opposite side of the needle.

The invention, fifteenthly, consists in cutting a slot in the face of the non-rotating bobbin-case into the interior of the barrel or chamber for containing the bobbin, in order to allow the needle to pass as close as may be to the bobbin, and thus diminish as much as possible the size of the bobbin-case.

The sixteenth part of the invention is an improvement in the means for supporting the holder for the under thread (a bobbin and bobbin-case or their substitutes) from a stationary part of the machine, so as to relieve the hook or looper of its weight; and it consists in hanging said holder from two projections placed above its center of gravity, and arranged one on each side of the vertical line through said center, the object being, mainly, to prevent swinging and to relieve the friction on the upper thread in passing between the projections, since the latter will never have bodily to lift the bobbin and bobbin-case, but only to tip it up on one side or the other.

The invention, seventeenthly, consists in improved means for giving access to the parts beneath the work-plate—that is to say, in a removable plate forming part of the work-plate and swiveled to the machine-frame, and specially in a semicircular plate swiveled at its center to said frame for covering, when desired, the opening in the bed of the frame. Ordinarily a plate sliding in grooves has been used for the purpose; but this is liable to bind, especially when the grooves or the edges of the plate become a little worn. The swiveled plate, since it turns on a center, is not liable to bind or stick fast. The edges of the swiveled plate are preferably supported by a bead or flange around the opening in the frame.

The invention, eighteenthly, consists in improved means for preventing the upper thread from becoming soiled by contact with the needle-bar—that is to say, in a cup attached to the lower part of the needle-bar. The thread passes over the outside of the cup, and preferably the head of the stationary arm or goose-neck has an annular groove to receive it when the needle-bar is lifted. This part of the invention also consists in the combination, with the cup attached to and movable with the needle-bar, of a bushing or tubular bearing for said bar, so arranged that when the needle-bar rises the cup passes over it nearly the full depth of said cup. The oil which collects in the cup is forced up in the bearing and on the outside of the bushing, and is retained thereon. The oil is thus reused continually, and is prevented from filling and overflowing the cup.

The invention, nineteenthly, consists in an improvement in the spool-stand which supports the spool, so that the thread is delivered from the side, which improvement is the arrangement of the spool-pin for the upper thread in an inclined position. It is found that in rapid running with the spool on a vertical pin the upper thread is delivered irregularly on account of the resistance. The difficulty is overcome by tilting the pin on one side, the inclined position giving a light tension with easy delivery.

The invention further comprises the union or combination of two or more of the above improvements in one machine, and also certain particular constructions and combinations of parts, as hereinafter set forth.

Having explained the principle of the invention, what we consider the best mode of carrying the same into effect will now be described, reference being had to the accompanying drawings, which form a part of this specification.

Figure 13:
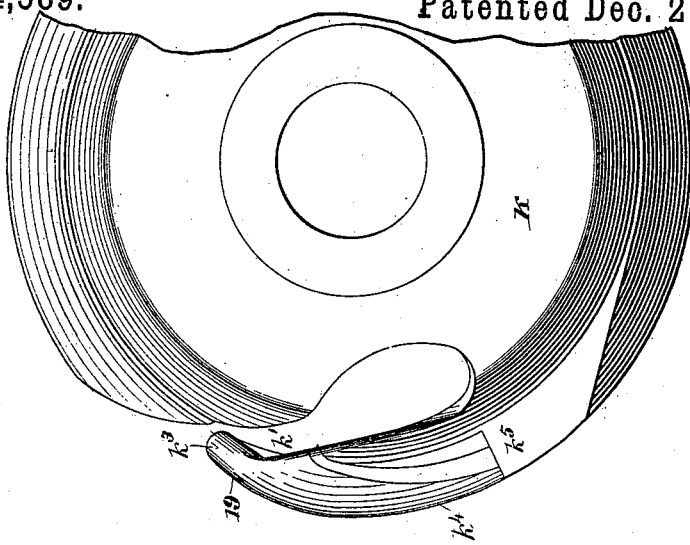
Figure 12:
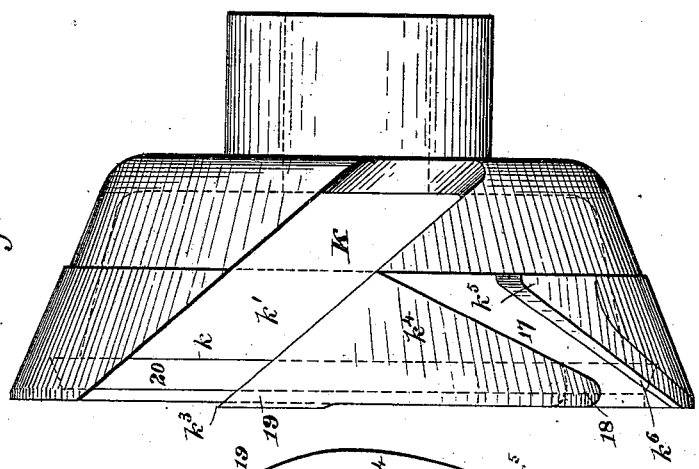
Figure 11:
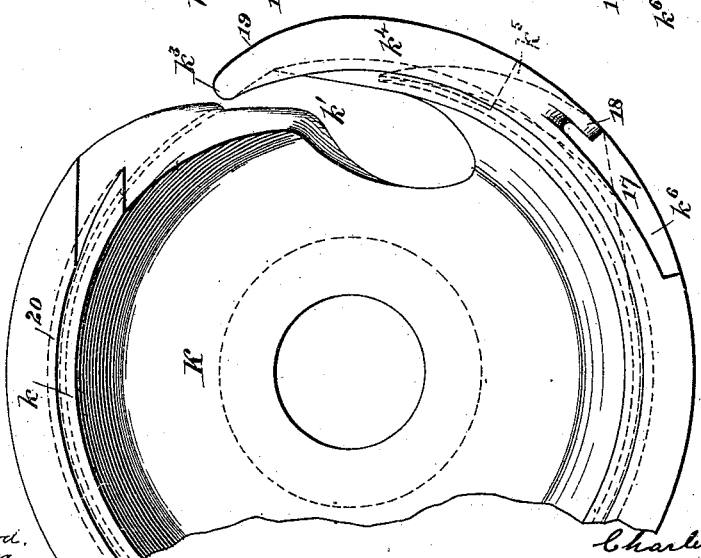
Figure 17:
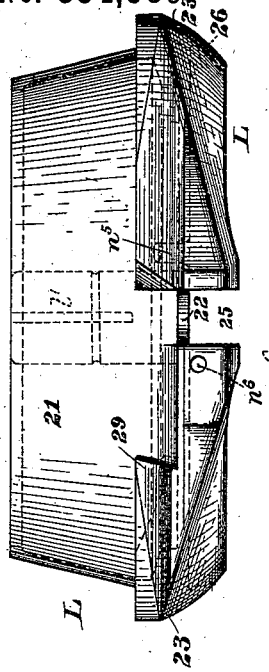
Figure 18:
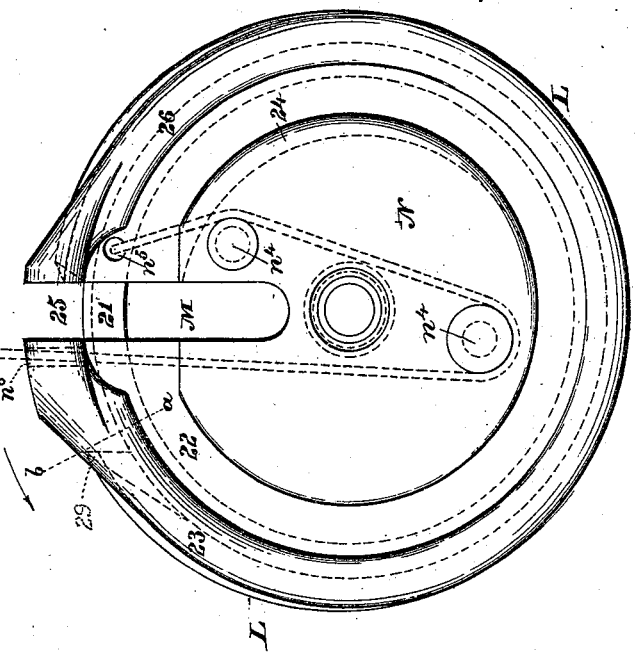
Figure 16:
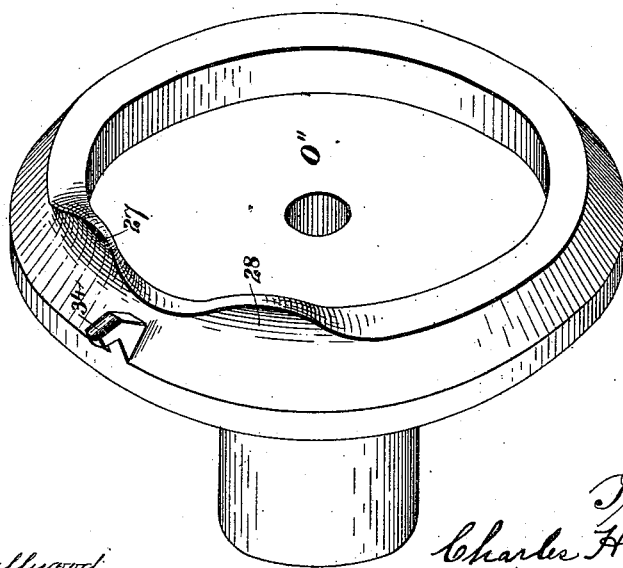

Figure 1 is a view partly in vertical longitudinal section and in rear elevation; Fig. 2, an end view partly in vertical cross-section; Fig. 3, a face view of the head of the machine with rotary take-up removed; Fig. 4, a face view of the head, showing the position of the parts in sewing the thickest goods at the time of completing a stitch; Fig. 5, a partial plan view; Fig. 6, a sectional elevation through the standard of the goose-neck, looking toward the head of the machine; Figs. 7 and 8, detail views in sectional elevation of parts on the head; Fig. 9, a central vertical section (enlarged) through the rotary hook, bobbin, bobbin-case, hanger, and holder; Fig. 10, a partial view in section through the hook, bobbin-case, and hanger, in plan inclined to the vertical, as indicated by lines a b, Figs. 15 and 18, looking in the direction of the arrow; Fig. 11, a face view of the rotary hook; Fig. 12, an edge view of the same; Fig. 13, a back view; Fig. 14, a perspective; Fig. 15, a face view of the bobbin-hanger; Fig. 16, a perspective view of the bobbin-hanger; Fig. 17, a plan view of the bobbin-case; Fig. 18, a face view of the same threaded; Fig. 19, a perspective; Fig. 20, an end view of the holder and bobbin-hanger; Fig. 21, a sectional elevation showing how the machine-frame is hinged to the table or wheel-stand; Fig. 22, a similar view with the machine-frame turned up for examination, and Figs. 23 and 24 a side view and a plan of the plates which are attached to the table or stand.

The main shaft C turns in bearings in the goose-neck or stationary arm B of the machine-frame. Under the work-plate A is the shaft D, which carries at one end the rotary hook or looper K, and at the other end is geared with the main shaft C, so as to make three revolutions to one of the latter. The motion is conveyed through the train of gears in the standard of the goose-neck. The feed is operated by the eccentric E, which gives all four of the motions to the feed-surface. As shown, the feed mechanism is of the improved construction forming the subject of our application for Letters Patent of even date herewith, and officially numbered 102,438, for improvement in feed mechanism for sewing-machines, but could be such as described in our former patent. The needle-bar F is operated by a crank, F', through a short pitman, $F^3$, and cross-head $F^2$, and the rotary take-up H is composed of two plates connected together by the pins $h^2\ h^3$, fastened to the outer end of the crank F' by a screw through the inner plate.

So far the machine is substantially like that of our former patent, except in the feed mechanism and the matter of giving three instead of two revolutions to the hook-shaft D, and also in the relative position of the take-up pins $h^2\ h^3$, which has been altered, as clearly shown in the drawings. (See Figs. 2 and 4.)

With the rotary take-up H are combined the thread-guides $h^8\ h^9$—the upper one fixed, the lower shifting or adjustable. The thread passes from the guide $h^8$, between the plates of take-up H, behind the pins $h^2 h^3$, to the guide $h^9$. The shifting or adjustable thread-guide $h^9$ is formed in or carried by a bar, 1, jointed at the opposite end, 3, to the presser-bar G, and sliding in a groove in the head of a pin, 2, whose shank fits loosely in a hole in the head of the machine, so that it may turn with the sliding bar 1 whenever the presser-foot is raised or lowered. As the presser-foot is raised it moves the thread-guide $h^9$ in the direction opposite to the motion of the take-up pins $h^2 h^3$ in drawing in the thread, and brings it closer to the upper guide, $h^8$, so that the take-up pins will at each revolution draw in and give down a length of thread which is greater or less as the presser-foot and presser-bar are more or less raised. Work of different thickness, therefore, by holding up the presser-foot more or less, regulates the effective action of the rotary take-up. The adjustment of the thread-guide $h^9$ also has the effect of making the pins complete their drawing-in action sooner, the farther the guide is moved forward. The principal alteration in the timing of the take-up is, however, effected not by this means, but by the auxiliary take-up or thread-controller, through which the thread passes on its way to the rotary take-up H from the tension $G^4$. This apparatus consists of a take-up pin, 4, which is fastened to the top of the needle-bar F by a screw, 5, and which is curved downward in the middle, so that the thread being drawn into the lowest point will always occupy the same position, two thread-guides, 6 7, on opposite sides of said pin 4, and an adjustable yoke, 8, in which the guides 6 7 are formed, or by which they are carried. The yoke 8 is pivoted in the middle at 9 to the stationary piece 10, fixed to the head of the machine, and at its rear end is connected at 11 by a slot-and-pin connection with the presser-bar G. As the presser-bar is raised, therefore, the yoke 8 is moved on its pivot and the guides 6 7 are depressed. As the needle-bar F reciprocates, the take-up pin 4 presses the thread upward between the thread-guides 6 7, making a longer or shorter loop as the said guides are more or less depressed.

Since the amount of depression depends upon the position of the presser-bar, and this upon the thickness of the work under the presser-foot, which in sewing rests upon the work, it follows that as the work is thicker the pin 4 of the auxiliary take-up comes the sooner into contact with the thread between the thread-guides 6 and 7, takes up and gives out a longer loop, and releases the thread at a later point in its descent. The effect of the auxiliary take-up of itself is therefore to draw in and give out a length of loop proportionate to the thickness of the goods, and while it is obvious that a reciprocatory take-up adjustable to draw in and give out to the needle and interlocking device (hook or shuttle) more or less thread, according to the thickness of the work, could be constructed in a similar manner, the apparatus shown has no such function, or has it only to an inconsiderable extent, but from its arrangement or timing relatively to the rotary take-up H merely or mainly changes the length of thread which is given out at different periods in the formation of the stitch, releasing more thread in the beginning (that is, immediately after the completion or tightening of the preceding stitch) in sewing thick than in sewing thin work, or, in other words, giving out slack, so as to leave the thread free earlier or later in the descent of the needle, according to the thickness of the work.

The rotary take-up begins to draw in the thread as soon as the loop has been carried around the body of the under thread. Assuming that thin work (say a thickness or two of muslin) is under the presser-foot, the pin 4 of the auxiliary take-up has just begun to press the thread up between the thread-guides 6 and 7. The two take-ups or two parts of the take-up proceed together to draw in thread; but while the rotary take-up is in full action the needle-bar F has reached the top of its stroke and begun to descend. The take-up pin 4 therefore gives up to the rotary take-up the small loop which it has drawn in. As the rotary take-up completes its drawing-in action the needle-bar and its take-up pin are about in the position they occupied at the beginning of the taking-up action. The auxiliary take-up has not (at least not materially) altered the operation of the rotary take-up. The rotary take-up pins, being at this time nearly equidistant from the guides $h^8$ $h^9$, and therefore at or near the dead-point of the take-up, give out the thread very slowly, so that they maintain sufficient control over the slackened loop to prevent its fouling the point of the needle; but when the needle has penetrated the thin fabric their action is more rapid, and they leave the loop entirely free. The take-up pin 4, being below and out of contact with the thread, of course has no influence upon it during this time. If, however, the presser-foot had been raised by thick work and the thread-guides 6 7 depressed, the pin 4, instead of being about on a level with said thread-guides when the rotary take-up ceased to draw thread from below, would be above them, and therefore hold a loop. By giving out this loop it increases the supply of thread at the beginning of the stitch, so that the thread, instead of being held back until the needle-eye has descended almost to the work-plate, would be left free at or before it reached the upper surface of the thick work. The loop given out by the reciprocatory take-up pin being proportionate to the thickness of the work, the supply of thread at the beginning of the stitch will be more or less accordingly. The two take-ups or two parts of the take-up acting together leave the thread free as or immediately before the eye of the needle enters the cloth, whatever the thickness, and while they have earlier slackened the thread to relieve the needle of side strain in entering the work, they have until then maintained sufficient control over it to prevent its fouling the needle.

The needle-bar descends to the bottom of its stroke, rises, throws the loop for the rotary hook, and continues its upward movement until the pin 4 again presses the loop upward between the guides 6 and 7. It and the rotary hook then draw on the thread simultaneously, the rotary take-up continuing to give it out. By the time the rotary hook has carried the loop under the bobbin and the rotary take-up is again ready to draw in the thread the pin 4 has taken up a loop of substantially the same length it had when the previous stitch was tightened. The auxiliary take-up, therefore, causes more thread to be given up as (and before) the needle enters the fabric, and less while the hook is carrying down the loop, without materially altering the length of thread drawn in and given out at each stitch.

As already stated, the adjustment of the thread-guide $h^9$ changes the time at which the rotary take-up completes the drawing in of the thread. It therefore also changes to the same or about the same extent the time at which the slackening up of the thread commences; but this action is of minor importance. Its principal function is to vary or regulate the length of thread drawn in and given out, as that of the auxiliary take-up or thread-controller is to vary or regulate the distribution of that length, or the amounts which shall be given down at different times. In the practical working out of these principles the three revolutions of the hook to a stitch is a valuable feature, since by giving a larger part of the time occupied in making a stitch to the action of the take-up it allows more latitude in adapting the operation of the several parts to each other.

In order to prevent the upper or needle thread from being soiled by contact with the oily needle-bar, the latter is provided at the lower end with a thread-protector, I, in the form of a cup. This cup catches any oil that may run down the needle, and prevents the thread, which passes over its exterior to the guide $i$, from bulging or buckling inward toward the needle-bar. An annular space, $i'$, is left around the lower bushing for the needle-bar to receive the cup on its ascent. The oil in the cup is forced up around the bushing or tubular bearing and continually lubricates the same. It remains to a greater or less extent in the bearing and on the outside of the bushing, so that the cup is prevented from getting full and running over.

The thread-shield $I^2$ prevents the thread from impaling itself on the point of the needle when drawn in by the take-up. It consists of a bent bar inserted through and fixed in the journal-pin 12, (which is supported in the head of the machine,) and engaged at its upper end by the pin 13, supported and journaled in the cross-head $F^2$. As the cross-head is reciprocated the pin 13 slides over the upper part of the bar, and moves the lower part, which forms the thread-shield proper, toward and away from the needle. It has the same operation as the thread-shield in our former patent; but the operating mechanism is more compact and durable, and is out of the way of the devices for adjusting the thread-guide $h^9$. The spool-stand $G^5$ is set on an incline and the thread delivered from its side to the thread-guide $g$ and tension $G^4$ (of ordinary construction.) The presser-bar may be held down in any ordinary or suitable way. As shown, it is connected by a screw-pin with the plunger 14, which is forced down by the spiral compression-spring 15, and the pressure is adjusted by the thumb-screw 16. $G'$ is the cam for lifting the presser-bar when desired.

The rotary hook K is cup-shaped, with frusto-conical interior and exterior periphery. It is cut away at $k'$, so that the point $k^4$ extends the entire width. The loop-shedder $k^5$ is in the form of a projection. In front of it is a groove, 17, extending obliquely across the hook-point. In this groove the outer strand of the needle-loop is laid, being caught by the point of the shedder and carried around by the shoulder $k^6$, forming the front wall thereof. A nick or under-cut on the opposite side of the groove forms a loop-detainer, 18, which prevents the needle-loop from slipping forward on the point of the hook as it (the point) ascends after being passed under the body of the under thread. Near its extreme end, at 19, the point of the hook is beveled on top, so that the extreme end $k^3$ is below the general periphery of the hook, and will be below the outer strand of the needle-loop when in the ascent of the hook-point it extends from the loop-detainer 18 along the top of said point to the needle-hole in the work-plate. The extreme end $k^3$ will therefore pass under and not catch the said strand. On the inner periphery of the hook is a concentric shoulder, $k$, and in front of it an undercut groove, 20, or groove the bottom of which is farther removed from the center of the hook than either of its edges.

The bobbin-case L has a frusto-conical barrel, 21, a face-plate, 22, a central spindle, $l'$, attached to said face-plate, and a rim, 23. The cylindrical bobbin M, which contains the body of the under thread, fits on the spindle $l'$ within the frusto-conical barrel 21 of the bobbin-case. The thread passes out through the hole $n^5$ in the face-plate. The bobbin is retained in place by the split ring $m$. A shallow groove is turned on the outside of the spindle $l'$, for the ring to enter when the bobbin is inserted, in order to hold it more securely in place. On the face-plate is the tension-plate N, held against the face-plate by the spiral compression-spring $n^2$, screw $n$, and nut $n'$, and prevented from turning by pins $n^4$, as in the patented machine. The position of the pins is changed. Instead of being turned up to facilitate the introduction of the thread beneath it, the tension-plate is beveled on the under side at 24. The face-plate 22, as well as the tension-plate N, is slotted for the passage of the needle. The rim 23 is provided with a notch, 25, also with a hole, $n^6$, forming a thread-guide in the rear of the notch 25, for the passage of the under thread from the bobbin-case to the needle-hole in the cloth-plate. The portions of the rim on either side of the notch extend farther from the center than the rest of the rim, so that the hook-point will pass behind and not above them. The barrel and inner half, or, rather, inner third, of the rim are introduced into the cup-shaped hook. At the top, adjacent to the notch 25, this said inner portion of the rim is cut away, as shown best in Figs. 17 and 18, so that the inner strand may extend from the notch 25 to the back of the bobbin-case. At 29 is an overhanging projection formed by milling a recess or making an under-cut in the nearly-vertical edge of this portion of the rim. This overhanging projection 29, when the bobbin-case is inserted in the hook, lies just under the groove 20, and projects beyond the shoulder $k$ into said groove. The inner strand of the needle-loop under the point of the hook is stretched across said groove, and as it is carried onward by the hook is caught by said projection, the recess or under-cut in its face preventing the strand from slipping over the top. The upper surface of the inner portion of the rim is beveled or inclined to correspond in shape to the groove 20, so that when inserted in the hook the bobbin-case can be lifted, the inner portion of the rim entering the groove 20. The rim 23 is rounded on the face to allow the thread to slip over it easily. An undercut groove, 26, is turned in the face of the bobbin-case. The projections 27 28, which form part of the bobbin-hanger O″, fit in said groove on either side of the notch 25, and support the bobbin-case within the hook. Their upper surfaces are concentric with the ring or outer edge of the groove which rests upon them.

The bobbin-hanger, instead of being simply a hook to support the bobbin-case, forms also a bearing for the lower part of said case. The projections 27 28 are so shaped that the upper part of the bobbin-case will be held out from the vertical face of the hanger. A projection, 34, attached to or made in one piece with the hanger, fits in the notch 25 of the bobbin-case when the latter is suspended from the projections 27 28. This face of the projection 34 is grooved. The hanger has a central hollow shank, by which it is fixed in the holder O. The screw-driver $o^9$, for turning the tension-screw $n$ on the bobbin-case, passes through this shank. The holder O is hinged to a stationary part, O′, of the frame by a journal-pin, 30, which is fixed by a set-screw in said holder and turns in its bearing in the part O′. On the outer end of said pin is a finger, 31, which is so placed with reference to a finger, 32, on the rock-shaft 33, forming part of the feed mechanism, that when the feed-surface is depressed the finger on the rock-shaft places itself in the path of the finger 31, and prevents the holder O being moved in or out; but when the feed-surface is raised it is removed from said path and allows the holder to be turned for inserting the bobbin and bobbin-case in the hook, or for removing it therefrom. A spring-latch, $o^5$, retains the holder in its upright position for retaining the bobbin-case in the hook.

To give access to the rotary hook, bobbin-hanger, and adjacent parts, a semicircular opening is made in the work-plate, and a semicircular plate, 35, is swiveled in the center to the machine-frame, so that it can be turned to cover or uncover said opening. A ledge, 36, supports the edge of the swiveled plate when it is turned to cover the opening in the work-plate. A hole is formed in the swiveled plate to admit the finger of the operator for turning the screw-driver $o^9$, or for moving the swiveled plate aside.

The frame of the machine is provided with hinges, preferably cast in one piece therewith, for attachment to the wheel stand or table. These hinges consist each of trunnions 40, a central web, 41, and a stop, 42, on the bottom. The top of the stand or table is hollowed at points where the hinges are to be, and these hollows are covered with a plate, 43, provided with depressions 44, to receive the trunnions 40, and a slot, 45, for the web 41 to pass through. The plates 43 are secured, by screws or otherwise, to the top of the table or stand. The machine being held at an incline, the webs 41 are passed through the slots, and the trunnions 40 are allowed to rest in the depressions 44. The frame can now be turned down, as shown in Fig. 21, in position for sewing, or up, as shown in Fig. 22, in order to allow the parts under the work-plate to be examined and oiled. When turned up the stops 42 prevent it from falling over.

The machine being properly threaded and adjusted, the operation is as follows: The eye-pointed needle I' carries the loop of the upper thread through the work, and, rising slightly, throws a loop, which is further pressed out into the path of the point $k^4$ of the rotary hook by contact of the thread on the opposite side of the needle with the stationary projection 34. The extreme end $k^3$ of the point enters the loop, and the point spreads it entirely across the bobbin-case. The outer strand is caught by the front edge of the loop-shedder $k^5$ and laid in the groove 17. The inner strand catches under the overhanging projection 29 on the bobbin-case. The needle continues its ascent and the hook carries down the loop, the inner strand going behind the bobbin and bobbin-case, (the breadth of the point, the cone shape of the inner surface of the point, and the cone shape of the barrel of the bobbin-case insuring its taking the right path,) and the outer strand passes in front between the bobbin-case L and the hanger O'', pushing back the bobbin-case into the hook, as shown in Fig. 9, as it passes the bottom, where the bobbin-case normally rests upon the face of the hanger. The thread has been perfectly free. If thick goods are sewing, the needle-bar or reciprocatory take-up has taken up the excess of loop which would otherwise be given down by the rotary take-up. If thin goods are sewing, the rotary take-up will give down the right quantity. In that case, as the needle-bar or reciprocatory take-up has given out no loop as the needle enters the work, it need not, in order to avoid an excess, draw in any as it leaves the work on its upstroke. The rotary hook has therefore just enough thread to extend properly around the bobbin-case and its point when in its lowest position. At this time the outer strand of the needle-loop has not yet passed between the supporting-projection 27 and the bobbin-case. As the hook-point $k^4$ passes under the bobbin-case the rotary take-up, assisted by the auxiliary or reciprocatory take-up, draws on the upper thread, the loop of which slips forward on the point of the hook and is caught by the detainer 18. As the hook-point ascends, the take-up draws in the slack thread, the outer strand, which is between the bobbin-case and bobbin-hanger, being drawn through the detainer. The friction upon this outer strand at the time the point of the hook passes the needle-hole in its second revolution is sufficient to keep the inner strand between the detainer and the needle-hole nearly straight, so that the point passes under without taking it. As the detainer 18 passes the needle-hole it releases the loop, which is pulled by the take-up between the projection 28 and the bobbin-case, so that the strand is drawn into the notch 25 between the bobbin-case and the projection 34. This strand remains in the notch 25 until the loop or bight has been drawn between the projection 27 and the bobbin-case, when the loop is drawn through the work-plate into the fabric, carrying a bight of under thread with it. When the loop passes around the projections 27 and 28, the feed-surface and work are elevated, and the bobbin-case is suspended therefrom by the under thread, the pressure against the part of the hook which for the time being is at the top serving to draw off the necessary thread from the bobbin through the tension. When the feed-surface and work drop down, the bobbin and bobbin-case are again supported by the hanger. The rotary hook completes its second and third revolutions idly, and as it next passes the needle-hole takes down a new loop.

Modifications may be made in details without departing from the spirit of the invention, and parts of the invention may be used separately—as, for example, by applying the improved adjustable take-up to a shuttle-machine or to a rotary-hook machine more or less modified from that herein described, and so for other improvements.

We claim the new improvements herein described, all and several, to wit:

1. The combination, with the presser-foot and presser-bar, needle and needle-bar, and tension apparatus of a lock-stitch sewing-machine, of a take-up and thread-guides so constructed as to act upon and hold the thread wholly by rigid or positive devices between the tension apparatus and the eye of the needle, adjusting means for regulating the length of thread drawn in and given out at each stitch, and a mechanical connection between said adjusting means and the presser-foot for making the adjustment automatic, substantially as described.

2. The combination, with the presser-foot and presser-bar, needle and needle-bar, rotary hook, and tension apparatus of a lock-stitch sewing-machine completing each stitch independently, of a take-up and thread-guides so constructed as to act upon and hold the thread wholly by rigid or positive devices between the tension apparatus and the eye of the needle, adjusting means for regulating the length of thread drawn in and given out at each stitch, a mechanical connection between the adjusting means and the presser-foot, and mechanism connecting said needle-bar, take-up, and rotary hook for making them act in due sequence to form the stitch, substantially as described.

3. The combination, with a rotary take-up having a device for drawing in the thread positively and for releasing it by moving away without casting it off, of means adjustable to vary the length of thread drawn in and given out, and a connection between the said means and the presser-foot for making the adjustment automatic, substantially as described.

4. The combination, with a rotary take-up having one or more pins or take-up devices movable in a circular path, and thread-guides arranged in the line of a chord to said circular path, of adjusting means for shifting one of said thread-guides circumferentially with reference to the take-up, in order to vary the length of thread drawn in and given out at each revolution thereof, substantially as described.

5. The combination, with the rotary take-up and the adjustable thread-guide therefor, of the presser-foot and the mechanical connections between the presser-foot and said guide for adjusting the same automatically, substantially as described.

6. The combination, with the presser-foot and presser-bar, needle and needle-bar, and tension apparatus of a lock-stitch sewing-machine, of a take-up and thread-guides so constructed as to act upon and hold the thread between the tension apparatus and the needle-eye wholly by rigid or positive devices, means whereby the point at which the tightened thread is released may be varied, and a mechanical connection with the presser-foot, whereby the release is made sooner the higher the presser-foot, substantially as described.

7. The combination, with the presser-foot and presser-bar, needle and needle-bar, rotary hook, and tension apparatus of a lock-stitch sewing-machine completing each stitch independently, of a take-up and thread-guides so constructed as to act upon and hold the thread between the tension apparatus and needle wholly by rigid or positive devices, means whereby the point at which the tightened thread is released may be varied, and a mechanical connection with the presser-foot, whereby the release is made sooner the higher the presser-foot, substantially as described.

8. The combination, with a positively-acting principal take-up, of a positively-acting auxiliary take-up, means whereby the loop drawn in and given out by the auxiliary take-up may be varied, a mechanical connection with the presser-foot for adjusting said means so as to increase the loop the higher the presser-foot, and operating mechanism connecting the two take-ups with each other, substantially as described.

9. The combination, with the presser-foot and presser-bar, needle and needle-bar, and tension apparatus of a lock-stitch sewing-machine, of a take-up and thread-guides constructed to control the thread between the tension apparatus and needle wholly by rigid or positive devices, and means mechanically connected with and automatically adjusted by the presser-foot for regulating the length of thread drawn in and given out in forming each stitch, and also the point at which the tightened thread is released, substantially as described.

10. The combination, with a rotary take-up, of an auxiliary take-up for modifying the action in giving down thread, and mechanism for connecting and operating said take-ups, substantially as described.

11. A sewing-machine take-up comprising a rotary part in combination with an auxiliary reciprocatory part, and mechanism for rotating and reciprocating said parts, respectively, substantially as described.

12. The combination, with the rotary take-up, of the auxiliary take-up and the adjustable thread-guides for said auxiliary take-up, substantially as described.

13. The combination, with the presser-foot and presser-bar, needle and needle-bar, tension apparatus, and rotary hook of a lock-stitch sewing-machine completing each stitch independently, of a take-up and thread-guides so constructed as to control the thread between the tension apparatus and needle wholly by rigid or positive devices, and means mechanically connected with the presser-foot for regulating the length of thread drawn in and given out at each stitch, and also the point at which the tightened thread is released, substantially as described.

14. The combination, with a rotary take-up, of the needle-bar provided with means for acting upon the thread so as to constitute an auxiliary take-up, substantially as described.

15. The combination of the rotary take-up, the auxiliary take-up, and their two sets of shifting or adjustable thread-guides, substantially as described.

16. The combination, with a sewing-machine take-up composed of a rotary and a reciprocatory part, and the presser-foot of the machine, of means connected with and adjusted by the presser-foot for varying the action of said take-up in accordance with the thickness of the work under said foot, substantially as described.

17. The combination, with the needle-bar and take-up of a sewing-machine, of a rotary hook and mechanism for imparting thereto three revolutions to each reciprocation of the needle-bar, substantially as described.

18. The rotary hook provided with a loop-detainer on the outside of the point, in combination with the needle-bar, the take-up, and mechanism for imparting three revolutions to the hook for each reciprocation of the needle-bar, substantially as described.

19. A rotary hook provided with a loop-shedder and loop-detainer, substantially as described.

20. A cup-shaped rotary hook having its internal periphery of frusto-conical form and provided with a point the full width of the hook, in combination with a bobbin-case and a cylindrical bobbin supported therein with its axis parallel to or in line with the axis of the hook, and a rotary shaft on which the hook is rigidly fastened, substantially as described.

21. The combination, with the bobbin-case provided with a frusto-conical barrel, of the cup-shaped rotary hook having a frusto-conical periphery and provided with a point the width of the hook, substantially as described.

22. A bobbin-case provided with a frusto-conical barrel, a rim at the enlarged end of the cone, and a spindle for the bobbin in the center of the barrel, substantially as described.

23. The combination, with a reciprocating needle and a rotary hook, of a non-rotating bobbin-case provided with an overhanging projection at the top of the case, on that side of the needle's path toward which the point of the hook moves when taking up a loop, for catching and retaining the inner strand of the needle-loop as it is carried onward by the point of the hook, substantially as described.

24. The combination, with a reciprocatory needle, a rotary hook, and a hanger for supporting the bobbin-case in the hook, of the non-rotating bobbin-case provided with an overhanging projection at the top of the case, on that side of the needle's path toward which the point of the hook moves in taking a loop, for catching and retaining the inner strand of the needle-loop, substantially as described.

25. The combination, with a rotary hook having an undercut groove turned therein, of a non-rotating bobbin-case supported in the hook from a stationary part of the machine, and having a projection for catching the inner strand of the needle-loop shaped to enter said groove, substantially as described.

26. The combination of the cup-shaped rotary hook, having an undercut groove in the solid metal of its inner periphery, with the non-rotating bobbin-case having an overhanging projection adapted to enter said groove, substantially as described.

27. The combination, with the rotary hook, of the bobbin-case provided at the upper part with a notch for the passage of the needle, and the stationary projection extending into said notch to prevent rotation of the bobbin-case, substantially as described.

28. A bobbin-case having the face-plate slotted for the passage of the needle, substantially as described.

29. A bobbin-hanger provided with two projections, in combination with a bobbin-case suspended therefrom, said projections being on opposite sides of the vertical line through the center of gravity of the bobbin-case, substantially as described.

30. In combination with a bobbin-case and a rotary hook, a bobbin-hanger comprising two projections for supporting the bobbin-case and a projection between the two for preventing its rotation, substantially as described.

31. In combination with a bobbin-case and a rotary hook, a bobbin-hanger for supporting the bobbin-case, provided at the bottom with a bearing for the lower part of the bobbin-case, said bearing forming an integral part of said hanger, substantially as described.

32. The bobbin-hanger having a hollow shank for securing it in the holder therefor, in combination with the screw-driver or instrument for adjusting the tension of the under thread extending into or through said shank, substantially as described.

33. The combination, with the needle-bar and take-up of a sewing-machine, of a bobbin-hanger, a bobbin-case, a rotary hook, and mechanism for revolving said hook three revolutions to each reciprocation of the needle-bar, substantially as described.

34. The combination of the bobbin-hanger, bobbin-case, rotary hook provided with a loop-detainer, and mechanism for giving said hook three revolutions to each reciprocation of the needle-bar, substantially as described.

35. The combination, with the sewing-machine needle and the bobbin-case provided with an overhanging projection at the top of the case and on that side of the needle's path toward which the point of the hook moves, of the rotary hook having a wide point, which in passing over said projection projects on both sides beyond the end thereof, and having, further, a loop-shedder on the outside of said point, substantially as described.

36. The combination, with the main shaft turning in bearings in the goose-neck, and the hook-shaft below the work-plate, of the mechanism in the standard of the goose-neck having its parts proportioned, as explained, for giving said hook-shaft three revolutions for one of the former, and independent mechanism for moving the feed-surface, substantially as described.

37. The combination, with the tilting holder and finger movable therewith, of the rock-shaft forming part of the feed mechanism, and the finger carried by said rock-shaft and movable into and out of the path of the first-named finger, substantially as described.

38. The combination, with the vibratory thread-shield in the form of a bent bar, of the journal-pin having its bearings in the head of the machine and provided with a transverse hole, in which said bar is secured, the cross-head, and the pin journaled in said cross-head, and surrounding and sliding over the upper end of said bar, substantially as described.

39. The combination of the needle-bar, rotary take-up, rotary hook, and mechanism for giving the rotary hook three revolutions to each reciprocation of the needle-bar, substantially as described.

40. The combination of the needle-bar, the crank and short pitman for operating the needle-bar, the rotary take-up, the adjusting means for modifying the action of the take-up, the presser-foot, the connection between the adjusting means and the presser-foot, and the rotary hook, substantially as described.

41. The combination of the main shaft turning in bearings in the goose-neck, the needle-bar, the crank and short pitman for reciprocating said needle-bar, the rotary take-up in the head of the machine, the adjusting means for modifying the action of the take-up, the rotary hook, the mechanism for giving it three revolutions to each reciprocation of the needle-bar, the bobbin, the bobbin-case, and the bobbin-hanger, substantially as described.

42. The combination, with the needle-bar and cup attached thereto, of the bushing or tubular bearing for said bar, arranged so that the cup passes over it, substantially as described.

43. The combination, with the needle-bar and the presser-bar of a sewing-machine, of a pivoted yoke provided with thread-guides and connected with the presser-bar, and a take-up pin fastened to the needle-bar, the said pin leaving the thread to be supported by said yoke when it descends below the thread-guides therein, substantially as described.

In testimony whereof we have signed this specification in the presence of two subscribing witnesses.

CHAS. H. WILLCOX.
JAS. E. A. GIBBS.

Witnesses:
PHILIP MAURO,
GEO. T. SMALLWOOD.